(12) United States Patent
Okada

(10) Patent No.: US 7,947,125 B1
(45) Date of Patent: May 24, 2011

(54) FINE PARTICLE DISPERSION LIQUID CONTAINING TANTALUM OXIDE FINE PARTICLES, TANTALUM OXIDE FINE PARTICLE-RESIN COMPOSITE, AND METHOD OF PRODUCING FINE PARTICLE DISPERSION LIQUID

(75) Inventor: Seiji Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/913,035

(22) Filed: Oct. 27, 2010

(30) Foreign Application Priority Data

Oct. 30, 2009 (JP) ................................ 2009-251486

(51) Int. Cl.
*C08K 9/04* (2006.01)
*C08K 3/22* (2006.01)
*C08K 9/06* (2006.01)
*C09B 67/00* (2006.01)
*C09D 1/00* (2006.01)

(52) U.S. Cl. .................. 106/287.18; 106/401; 106/499; 241/16; 428/403; 428/405; 524/408

(58) Field of Classification Search ............ 106/287.18, 106/401, 499; 241/16; 428/403, 405; 524/408
See application file for complete search history.

(56) References Cited

U.S. PATENT DOCUMENTS

| 6,417,244 B1 * | 7/2002 | Wellinghoff et al. ......... 522/104 |
| 6,855,185 B2 * | 2/2005 | Osako et al. ..................... 75/363 |
| 7,044,836 B2 * | 5/2006 | Sun et al. ......................... 451/41 |
| 7,351,271 B2 * | 4/2008 | Osako et al. ..................... 75/255 |
| 7,521,871 B2 * | 4/2009 | Ritz et al. ...................... 313/635 |
| 7,560,160 B2 * | 7/2009 | Sudarshan et al. ............ 428/402 |
| 2004/0167280 A1 * | 8/2004 | Kayanoki ....................... 525/81 |
| 2009/0014062 A1 * | 1/2009 | Kayama et al. ............... 136/256 |

FOREIGN PATENT DOCUMENTS

| JP | 3-012460 A | | 1/1991 |
| JP | 2004175602 A | * | 6/2004 |
| JP | 2006-249424 A | | 9/2006 |
| JP | 2006-282789 A | | 10/2006 |
| JP | 2007022827 A | * | 2/2007 |
| JP | 2008-120848 A | | 5/2008 |

* cited by examiner

*Primary Examiner* — Anthony J Green
(74) *Attorney, Agent, or Firm* — Fitzpatrick, Cella, Harper & Scinto

(57) ABSTRACT

Provided are fine particle dispersion liquid containing tantalum oxide fine particles each having a small crystallite size and uniformly dispersed in an organic solvent, a tantalum oxide fine particle-resin composite, and a method of producing the dispersion liquid. The method of producing a fine particle dispersion liquid containing tantalum oxide fine particles includes: preparing a mixture of the tantalum oxide fine particles, a basic compound, a surface modifier, and an organic solvent; and subjecting the mixture to a dispersion treatment.

14 Claims, 2 Drawing Sheets

FINE PARTICLE DISPERSION LIQUID CONTAINING TANTALUM OXIDE FINE PARTICLES, TANTALUM OXIDE FINE PARTICLE-RESIN COMPOSITE, AND METHOD OF PRODUCING FINE PARTICLE DISPERSION LIQUID

BACKGROUND OF THE INVENTION

1. Field of the Invention

The present invention relates to a fine particle dispersion liquid containing tantalum oxide fine particles, a tantalum oxide fine particle-resin composite, and a method of producing a fine particle dispersion liquid.

2. Description of the Related Art

In recent years, researches on the formation of a colorless, transparent, high-refractive index resin have been vigorously conducted with a view to increasing the refractive index of a resin. The formation involves introducing fine particles of a metal oxide having a high refractive index such as titanium oxide, zirconium oxide, zinc oxide, tantalum oxide, or niobium oxide, or a composite oxide of two or more of such metal oxides into the resin while maintaining a dispersed state.

The high-refractive index, transparent resin has been expected to find applications in various optical materials because the resin is a material bringing together the characteristics of an organic polymer such as transparency, flexibility, a light weight, and ease of molding, and the characteristics of an inorganic compound such as a high refractive index, a high strength, and heat resistance. Specific examples of the optical materials include: light guides provided for optical fibers, optical wiring boards, and the like; the parts and optical lenses of various instruments such as an image sensor, a camera, and a copying machine; various display materials; and resin compositions for sealing optical semiconductor devices such as a printed wiring board and a light-emitting diode.

It has been generally said that, in order for a metal oxide fine particle-resin composite to be transparent, the following requirements have only to be satisfied. That is, metal oxide fine particles are uniformly dispersed in a resin, and the volume-average particle diameter of each of the metal oxide fine particles is equal to or less than a quarter of the wavelength of visible light. It has also been generally said that the volume-average particle diameter is desired to be as small as possible. However, the metal oxide fine particles are apt to agglomerate as their particle diameters become smaller, and hence it has been difficult to disperse the metal oxide fine particles having small particle diameters in the resin uniformly and stably.

A method of solving the problem is, for example, an approach involving subjecting metal oxide fine particles such as zirconia particles to a dispersion treatment in the presence of a surface modifier such as a silane coupling agent to disperse the metal oxide fine particles in a solvent or a resin uniformly and stably as described in each of Japanese Patent Application Laid-Open No. H03-12460 and Japanese Patent Application Laid-Open No. 2008-120848.

As described above, a metal oxide having a high refractive index is, for example, titanium oxide, zirconium oxide, zinc oxide, tantalum oxide, or niobium oxide. Tantalum oxide has a wider band gap than that of any other high-refractive index metal oxide such as titanium oxide, zinc oxide, or niobium oxide, and hence is substantially free of photocatalytic activity with visible light. Accordingly, a tantalum oxide-resin composite has a small influence on a resin caused by the photocatalytic activity of tantalum oxide and is excellent in light fastness. Although zirconium oxide is also a metal oxide having a wide band gap and free of photocatalytic activity, the refractive index of zirconium oxide is lower than that of tantalum oxide. By reason of the foregoing, expectations have been placed on the potential of tantalum oxide to serve as a new high-refractive index material.

However, it has been difficult to obtain tantalum oxide particles each having high dispersibility in a solvent or a resin and a small crystallite size at an inexpensive price.

SUMMARY OF THE INVENTION

An object of the present invention is to provide a fine particle dispersion liquid containing tantalum oxide fine particles each having a small crystallite size and uniformly dispersed in an organic solvent, a tantalum oxide fine particle-resin composite, and a method of producing the dispersion liquid for solving the above-mentioned problem.

A method of producing a fine particle dispersion liquid containing tantalum oxide fine particles according to an aspect of the present invention includes: preparing a mixture of the tantalum oxide fine particles, a basic compound, a surface modifier, and an organic solvent; and subjecting the mixture to a dispersion treatment.

A fine particle dispersion liquid containing tantalum oxide fine particles according to another aspect of the present invention includes: tantalum oxide fine particles each of which has a crystallite size of 10 nm or less and is covered with a surface modifier; a basic compound; and an organic solvent.

According to the method of producing a fine particle dispersion liquid containing tantalum oxide fine particles of the present invention, when the dispersion treatment is performed in the organic solvent containing the tantalum oxide fine particles, the basic compound, and the surface modifier, the crystallite size of each of the tantalum oxide fine particles reduces as compared with that before the dispersion treatment. Further, the fine particle dispersion liquid containing the tantalum oxide fine particles where the tantalum oxide fine particles are uniformly dispersed in the organic solvent is obtained.

The fine particle dispersion liquid containing tantalum oxide fine particles of the present invention can be easily compatible with a resin because both the crystallite size and volume-average particle diameter of each of the tantalum oxide fine particles are small enough for the tantalum oxide fine particles to be uniformly dispersed in the organic solvent. In addition, a tantalum oxide fine particle-resin composite produced by using the tantalum oxide fine particles or fine particle dispersion liquid containing tantalum oxide fine particles of the present invention has high transparency.

In addition, the use of the organic solvent of the fine particle dispersion liquid containing tantalum oxide fine particles of the present invention with one or both of a thermosetting monomer and a photocurable monomer allows one to integrate the method of producing a fine particle dispersion liquid containing tantalum oxide fine particles and the method of producing a tantalum oxide fine particle-resin composite of the present invention into a single method. Accordingly, the present invention can provide not only a tantalum oxide fine particle-resin composite having high transparency but also a simple method of producing the composite.

Further features of the present invention will become apparent from the following description of exemplary embodiments with reference to the attached drawings.

DESCRIPTION OF THE EMBODIMENTS

Figure 1:
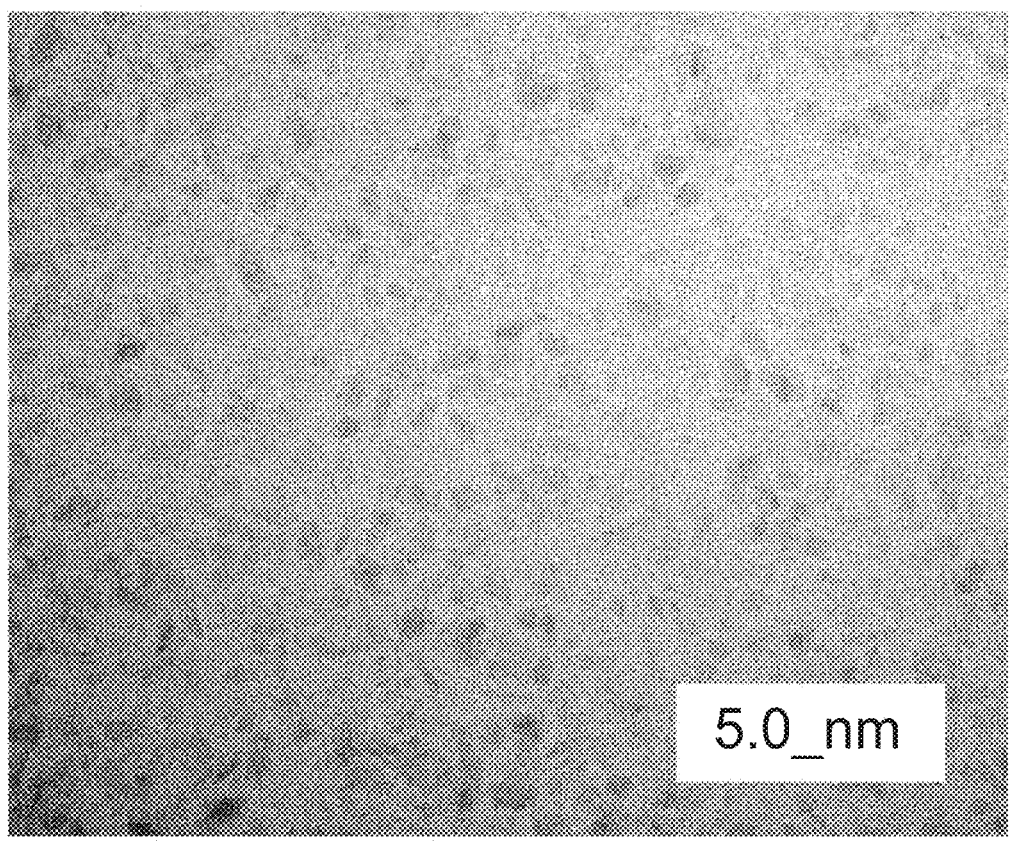
FIG. 1 is a TEM photograph of tantalum oxide fine particles in a fine particle dispersion liquid containing the tantalum oxide fine particles obtained in Example 1 of the present invention.

Hereinafter, the embodiments of the present invention are described in detail. It should be noted that the embodiments to be individually disclosed are examples of the method of producing a fine particle dispersion liquid containing tantalum oxide fine particles, fine particle dispersion liquid containing tantalum oxide fine particles, and tantalum oxide fine particle-resin composite and method of producing the composite of the present invention and the present invention is not limited to the examples.

(Method of Producing Tantalum Oxide Fine Particles)

The method of producing a fine particle dispersion liquid containing tantalum oxide fine particles according to an embodiment of the present invention includes: preparing a mixture of the tantalum oxide fine particles, a basic compound, a surface modifier, and an organic solvent; and subjecting the mixture to a dispersion treatment. When the dispersion treatment is performed in the organic solvent containing the tantalum oxide fine particles, the basic compound, and the surface modifier, the crystallite size of each of the tantalum oxide fine particles reduces as compared with that before the dispersion treatment. A possible reason for the fact that the crystallite size of each of the tantalum oxide fine particles reduces as described above is that the basic compound dissolves the tantalum oxide fine particles. Further, the resultant fine particle dispersion liquid containing the tantalum oxide fine particles is such that the tantalum oxide fine particles are uniformly dispersed in the organic solvent.

The terms "tantalum oxide fine particles," "basic compound," "surface modifier," and "organic solvent" as used herein are described later.

The doses of the tantalum oxide fine particles, the basic compound, and the surface modifier added to the organic solvent fall within the following ranges.

In the dispersing step, the tantalum oxide fine particles are preferably used at a ratio of 1 wt % or more to 50 wt % or less with respect to the organic solvent. In consideration of the dispersion efficiency and productivity of the fine particle dispersion liquid containing the tantalum oxide fine particles, the ratio is more preferably 5 wt % or more to 30 wt % or less.

In the dispersing step, the surface modifier is used at a ratio of preferably 5 wt % or more to 200 wt % or less, more preferably 30 wt % or more to 150 wt % or less with respect to the tantalum oxide fine particles.

The reasons for the preferred ratio are as described below. When the weight ratio of the surface modifier is less than 5 wt %, it becomes difficult to disperse the tantalum oxide fine particles in the organic solvent. As a result, the transparency of the fine particle dispersion liquid containing the tantalum oxide fine particles is lost. On the other hand, when the weight ratio of the surface modifier exceeds 200 wt %, an influence of the surface modifier on the refractive index of the tantalum oxide enlarges. As a result, the refractive index of the fine particle dispersion liquid containing the tantalum oxide fine particles reduces.

In the dispersing step, the basic compound is used at a ratio of preferably 0.01 wt % or more to 50 wt % or less, more preferably 1 wt % or more to 30 wt % or less with respect to the tantalum oxide fine particles. The reasons for the preferred ratio are as described below. When the weight ratio of the basic compound is less than 0.01 wt % with respect to the tantalum oxide fine particles, such effect that the crystallite size of each of the tantalum oxide fine particles reduces cannot be sufficiently obtained. On the other hand, when the weight ratio of the basic compound exceeds 50 wt %, an influence of the basic compound on the refractive index of the tantalum oxide enlarges. As a result, the refractive index of the fine particle dispersion liquid containing the tantalum oxide fine particles reduces.

A dispersion method employed in the dispersion treatment is not particularly limited, and examples of the method include wet dispersion methods such as a ball mill method, a vibration mill method, a planetary ball mill method, a bead mill method, a jet mill method, and a homogenizer method. Of those, the bead mill method or the jet mill method is preferably employed. This is because, in the bead mill method or the jet mill method, the particles can be shredded by applying a stronger force to each of the particles than that in any one of the other methods described above.

When the bead mill method is employed, beads to be used are not particularly limited, but zirconia beads each having high abrasion resistance are preferably used in order that the inclusion of impurities in the fine particle dispersion liquid containing the tantalum oxide fine particles may be avoided. The beads each have a particle diameter of preferably 1 μm or more to 100 μm or less, particularly preferably 20 μm or more to 50 μm or less. When the particle diameter of each of the beads is less than 1 μm, an impact force on a raw material powder is small, and hence the dispersion requires a long time. On the other hand, when the particle diameter of each of the beads exceeds 100 μm, the impact force on the raw material powder becomes so large that the dispersed particles each have increased surface energy and their reagglomeration is apt to occur. In addition, the filling factor of the beads, which is not particularly limited, is generally 30% or more to 90% or less, and is preferably 40% or more to 70% or less from the viewpoints of the viscosity and dispersion efficiency of the tantalum oxide dispersion liquid.

As described above, the fine particle dispersion liquid containing tantalum oxide fine particles according to the embodiment of the present invention is produced by the production method including: preparing the mixture of the tantalum oxide fine particles, the basic compound, the surface modifier, and the organic solvent; and subjecting the mixture to the dispersion treatment.

Accordingly, the contents of the tantalum oxide fine particles, the organic solvent, the basic compound, and the surface modifier in the fine particle dispersion liquid containing the tantalum oxide fine particles according to the embodiment of the present invention also fall within the above-mentioned ranges.

That is, the tantalum oxide fine particles are preferably used at a ratio of 1 wt % or more to 50 wt % or less with respect to the organic solvent. In consideration of the dispersion efficiency and productivity of the fine particle dispersion liquid containing the tantalum oxide fine particles, the ratio is more preferably 5 wt % or more to 30 wt % or less.

In addition, the surface modifier is used at a ratio of preferably 5 wt % or more to 200 wt % or less, more preferably 30 wt % or more to 150 wt % or less with respect to the tantalum oxide fine particles.

Further, the basic compound is used at a ratio of preferably 0.01 wt % or more to 50 wt % or less, more preferably 1 wt % or more to 30 wt % or less with respect to the tantalum oxide fine particles.

In the method of producing the tantalum oxide fine particles according to the embodiment of the present invention, the purifying step of removing the surface modifier, which is chemically bonded to the surface of each of the tantalum oxide fine particles and does not contribute to a surface treatment, to purify the dispersion liquid can be added as required after the dispersion treatment. The removing step of removing coarse particles in the fine particle dispersion liquid containing the tantalum oxide fine particles obtained in the production method can also be added. Although those steps are not particularly limited, examples of the steps include an ultrafiltration method, a centrifugal separation method, and a reprecipitation method.

(Fine Particle Dispersion Liquid Containing Tantalum Oxide Fine Particles)

A fine particle dispersion liquid containing tantalum oxide fine particles according to another embodiment of the present invention contains: tantalum oxide fine particles each of which has a crystallite size of 10 nm or less and is covered with a surface modifier; a basic compound; and an organic solvent.

The term "crystallite size" as used herein refers to the particle diameter of the minimum unit (primary particle) forming each particle. The particle diameter is a value D(110) calculated from the X-ray diffraction peak of the (110) surface of a particle obtained with an X-ray diffractometer (XRD) by using Debye-Scherrer's equation (Eq. 1) described below. It should be noted that the value D(110) is calculated from the following equation:

$$D(110) = K^* \pi / \beta \cos \theta \quad \text{(Eq. 1)}$$

where D(110) represents a crystallite size (crystallite size), $K=0.9$, $\pi Cu—K\alpha 1=0.154056$ nm, and represents the half width of the diffraction peak.

(Tantalum Oxide Fine Particles)

The structures of the tantalum oxide fine particles in the fine particle dispersion liquid containing the tantalum oxide fine particles according to the embodiment of the present invention are not particularly limited, and may be any one, or a mixture, of an α-type structure, β-type structure, a δ-type structure, and an amorphous structure.

A tantalum oxide fine particle-resin composite having high transparency is obtained because the tantalum oxide fine particles each have a crystallite size of 1 nm or more to 10 nm or less. In addition, the surface of each of the tantalum oxide fine particles is covered with the surface modifier, and hence a tantalum oxide fine particle-resin composite having the tantalum oxide fine particles uniformly and stably dispersed in a resin is obtained.

In addition, the above-mentioned tantalum oxide fine particles may be in a powder state or in a dispersion state in which the fine particles are dispersed in a solvent.

Further, the volume-average particle diameter of each of the tantalum oxide fine particles is preferably 1 nm or more to 20 nm or less. The term "volume-average particle diameter" as used herein refers to the particle diameter of a particle formed by the agglomeration of primary particles (secondary particle). The particle diameter is a value for a volume particle diameter when a cumulative frequency in the cumulative distribution function of volume particle diameters obtained from a dynamic light scattering particle diameter distribution-measuring apparatus (DLS) reaches 50% of the entirety.

(Basic Compound)

In the embodiment of the present invention, the basic compound in the fine particle dispersion liquid containing tantalum oxide fine particles is a component for reducing the crystallite size of each of the tantalum oxide fine particles. Examples of the basic compound used in the embodiment of the present invention include: ammonia (including an aqueous solution of ammonia); organic amine compounds; hydroxides of alkali metals and alkaline earth metals such as sodium hydroxide and potassium hydroxide; and alkoxides of alkali metals such as sodium methoxide and sodium ethoxide. Of those, the organic amine compounds are particularly preferred.

Here, the "organic amine compound" refers to an organic compound having a nitrogen atom. Examples of the organic amine compound include an alkylamine, an alkanolamine, an arylamine, a heterocyclic amine, and an alkoxyamine. Examples of the alkylamine include alkylamines each having 1 to 10 carbon atoms such as methylamine, ethylamine, propylamine, butylamine, hexylamine, octylamine, N,N-dimethylamine, N,N-diethylamine, N,N-dipropylamine, N,N-dibutylamine, trimethylamine, triethylamine, tripropylamine, and tributylamine. Examples of the alkanolamine include 2-(2-aminoethoxy)ethanol. Examples of the arylamine include aniline. Examples of the heterocyclic amine include pyridine.

As the basic compound, preferred is at least one basic compound selected from triethylamine, butylamine, N,N-dibutylamine, aniline, pyridine, tetramethylethylenediamine, and 2-(2-aminoethoxy)ethanol. Of those, pyridine is more preferred. This is because, when pyridine is used, an effect of reducing the crystallite size of each of the tantalum oxide fine particles through a dispersion treatment is large.

It should be noted that one kind of the above-mentioned basic compounds may be used alone or two or more kinds thereof may be used as a mixture.

(Organic Solvent)

Examples of the organic solvent included in the fine particle dispersion liquid containing tantalum oxide fine particles in this embodiment include: alcohols such as methanol, ethanol, n-propyl alcohol, i-propyl alcohol, n-butanol, and i-butanol; aliphatic hydrocarbons such as pentane, hexane, heptane, decane, and cyclohexane; aromatic hydrocarbons such as toluene and xylene; ethers such as diethyl ether, tetrahydrofuran, and 1,4-dioxane; ketones such as dimethyl ketone, methyl ethyl ketone, and acetone; esters such as ethyl acetate, and butyl acetate; and a thermosetting monomer and/or a photocurable monomer. As one or both of the thermosetting monomer and the photocurable monomer, there are given (meth)acryl monomers such as methyl acrylate, methyl methacrylate, and benzyl methacrylate, and epoxy monomers. In addition, two or more kinds of organic solvents may be mixed. The organic solvent is preferably at least one of tetrahydrofuran and methyl methacrylate.

As can be seen from the examples of the organic solvent, the organic solvent in the fine particle dispersion liquid containing tantalum oxide fine particles in the embodiment of the present invention, for example, at least one of a thermosetting monomer and a photocurable monomer can be used as a resin serving as a component for a tantalum oxide fine particle-resin composite in another embodiment of the present invention to be described later as well. As a result, the tantalum oxide fine particle-resin composite in the embodiment of the present invention can be obtained by adding one or both of a thermal polymerization initiator and a photopolymerization initiator to the fine particle dispersion liquid containing tantalum oxide fine particles and curing the mixture.

(Surface Modifier)

In the embodiment of the present invention, the surface modifier in the fine particle dispersion liquid containing tantalum oxide fine particles covers each of the tantalum oxide fine particles each having a small crystallite size in order that the tantalum oxide fine particles may be uniformly and stably dispersed in a resin. At least one of a silane coupling agent and a metal-based coupling agent can be used as the surface modifier used in the present invention. Of those, the silane coupling agent is particularly preferred from the viewpoints of, for example, ease of use and a cost. The term "silane coupling agent" as used herein refers to a hydrolyzable silane compound having such a structure that an organic substituent having affinity or reactivity for an organic substance is chemically bonded to a hydrolyzable silyl group having affinity or reactivity for an inorganic material.

In this embodiment, the silane coupling agent is not particularly limited as long as the silane coupling agent can be chemically bonded to a hydroxyl group on the surface of each of the tantalum oxide fine particles to exert a surface treatment function. Examples of the silane coupling agent include vinyltrimethoxysilane, vinyltriethoxysilane, vinyltriphenoxysilane, p-styryltrimethoxysilane, p-styryltriethoxysilane, p-styryltriphenoxysilane, 3-acryloxypropyltrimethoxysilane, 3-acryloxypropyltriethoxysilane, 3-acryloxypropyltriphenoxysilane, 3-methacryloxypropyltrimethoxysilane, 3-methacryloxypropyltriethoxysilane, 3-methacryloxypropyltriphenoxysilane, 3-aminopropyltrimethoxysilane, 3-mercaptopropyltrimethoxysilane, 3-mercaptopropyltriethoxysilane, 3-glycidoxypropyltrimethoxysilane, allyltrimethoxysilane, allyltriethoxysilane, allyltriphenoxysilane, methyltrimethoxysilane, dimethyldimethoxysilane, trimethylmethoxysilane, n-propyltrimethoxysilane, n-butyltriethoxysilane, n-hexyltrimethoxysilane, n-hexyltriethoxysilane, n-octyltriethoxysilane, n-decyltrimethoxysilane, phenyltrimethoxysilane, and diphenyldimethoxysilane. In addition, two or more kinds of surface modifiers may be used as a mixture. The surface modifier is preferably 3-methacryloxypropyltriethoxysilane.

In this embodiment, examples of the metal-based coupling agent include a titanate coupling agent, an aluminate coupling agent, and a zirconate coupling agent. Examples of the titanate coupling agent include isopropoxytitanium tristearate, triisopropoxytitanium isostearate, isopropoxytitanium tripalmitate, and isopropoxytitanium trimyristate. Examples of the aluminate coupling agent include acetoalkoxyaluminum diisopropylate.

The kind of the silane coupling agent used in the present invention to be described later can be appropriately selected depending on the kind of the organic solvent. For example, a silane coupling agent having a solubility parameter close to that of the organic solvent is preferably used.

(Tantalum Oxide Fine Particle-Resin Composite)

The tantalum oxide fine particle-resin composite in another embodiment of the present invention is obtained from a fine particle dispersion liquid containing tantalum oxide fine particles. The phrase "obtained from" as used herein refers to a state in which the composite is obtained by a method of producing a tantalum oxide fine particle-resin composite to be described later. Specific examples of the method include: a method involving polymerizing the fine particle dispersion liquid containing tantalum oxide fine particles without any treatment; a method involving mixing the fine particle dispersion liquid containing tantalum oxide fine particles and a resin, and removing the organic solvent; and a method involving taking a tantalum oxide powder out of the tantalum oxide dispersion liquid, and melting and kneading the powder with the resin.

Figure 2:
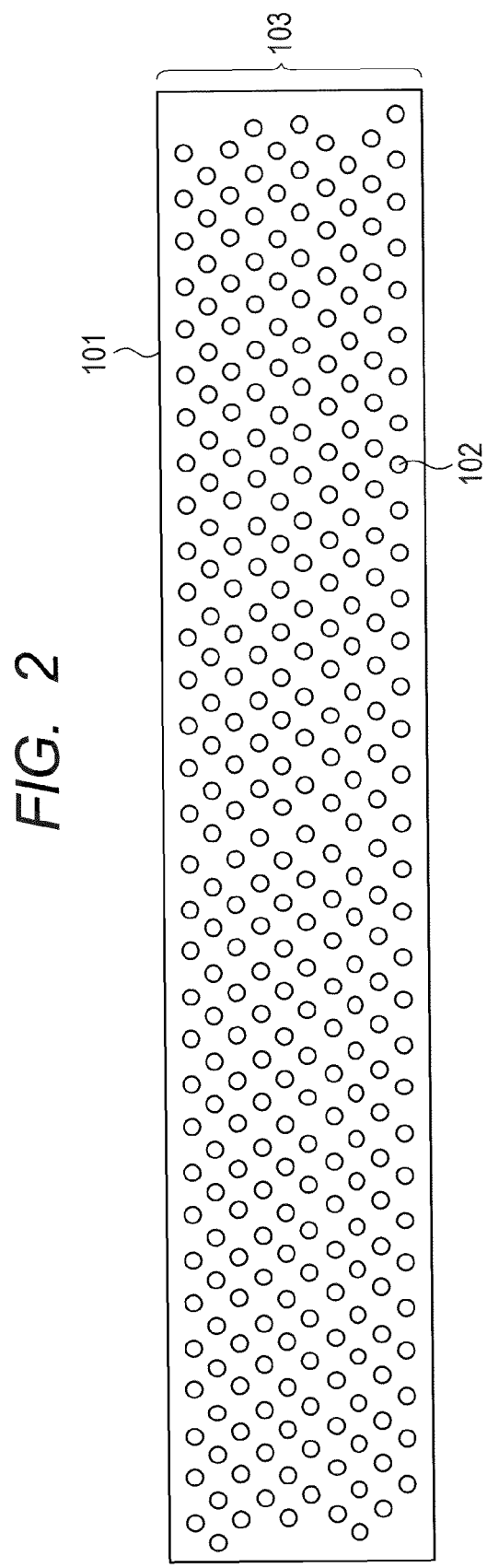
FIG. 2 is a schematic view for illustrating a fine particle-resin composite according to an embodiment of the present invention.

A fine particle-resin composite 103 according to the embodiment of the present invention has the tantalum oxide fine particles 102 and a resin 101 (FIG. 2). As illustrated in the figure, the tantalum oxide fine particles 102 are preferably dispersed in the resin 101 in a uniform fashion because the transparency of the fine particle-resin composite 103 is improved. It should be noted that any one of the materials listed in the following item (Resin) can be used as the resin 101.

(Method of Producing Tantalum Oxide Fine Particle-Resin Composite)

The tantalum oxide fine particle-resin composite can be produced with the tantalum oxide fine particles or the fine particle dispersion liquid containing tantalum oxide fine particles obtained by the production method in the embodiment of the present invention. Although a method of producing the tantalum oxide fine particle-resin composite is not particularly limited, the production can be performed by any one of the methods listed below selected depending on a material to be used and a purpose.

When, for example, a curable monomer is used as the organic solvent in the fine particle dispersion liquid containing tantalum oxide fine particles in the embodiment of the present invention, the tantalum oxide fine particle-resin composite in the embodiment of the present invention can be obtained by adding a step involving adding a polymerization initiator corresponding to the curable monomer and curing the mixture. As described above, a tantalum oxide fine particle-resin composite having high transparency can be easily produced by integrating the method of producing a fine particle dispersion liquid containing tantalum oxide fine particles and the method of producing a tantalum oxide fine particle-resin composite. In addition, the resultant tantalum oxide fine particle-resin composite may have a higher refractive index than that of the resin alone because the composite has tantalum oxide fine particles having high refractive indices.

The term "curable monomer" as used herein refers to one or both of a thermosetting monomer and a photocurable monomer, and the term "corresponding polymerization initiator" as used herein refers to one or both of a thermal polymerization initiator and a photopolymerization initiator.

The curable monomer cures the fine particle dispersion liquid containing tantalum oxide fine particles in the presence of a polymerization initiator by the application of an active energy ray such as ultraviolet light or a visible light ray or heating, or a combination of the application and the heating. As a result, the tantalum oxide fine particle-resin composite can be obtained.

Examples of the polymerization initiator include: a photopolymerization initiator that generates a radical by the application of an active energy ray such as ultraviolet light or a visible light ray; and a thermal polymerization initiator that generates a radical by heating. The photopolymerization initiator and the thermal polymerization initiator can be used in combination.

As the photopolymerization initiator, there may be used a known compound known to be usable in the application. Examples of the compound include benzophenone, benzoin methyl ether, benzoin propyl ether, diethoxyacetophenone, 1-hydroxycyclohexyl phenyl ketone, 2,6-dimethylbenzoyldiphenylphosphine oxide, and 2,4,6-trimethylbenzoyldiphenylphosphine oxide. One kind of those photopolymerization initiators may be used alone or two or more kinds thereof may be used in combination.

The photopolymerization initiator is typically used in an amount of 0.001 part by weight to 5 parts by weight with respect to 100 parts by weight of the curable monomer.

As the thermal polymerization initiator, there may be used a known compound known to be usable in the application. Examples of the compound include dicumyl peroxide, di-t-butyl peroxide, t-butyl peroxybenzoate, and t-butyl hydroperoxide. One kind of those thermal polymerization initiators may be used alone or two or more kinds thereof may be used in combination.

The thermal polymerization initiator is typically used in an amount of 0.1 part by weight to 10 parts by weight with respect to 100 parts by weight of the curable monomer.

In addition, another example of the production method includes the steps of: mixing the fine particle dispersion liquid containing tantalum oxide fine particles and the resin or a resin solution to prepare a tantalum oxide fine particle/resin mixed liquid; and removing the organic solvent from the tantalum oxide fine particle/resin mixed liquid.

Another example of the production method includes the steps of: obtaining a tantalum oxide fine particle powder having a crystallite size of 10 nm or less and covered with the surface modifier from the fine particle dispersion liquid containing tantalum oxide fine particles; and melting and kneading the tantalum oxide fine particle powder and the resin.

(Resin)

Although the resin in which the tantalum oxide fine particles are dispersed is not particularly limited as long as the resin is a transparent resin material to be generally used as an optical material, the resin is preferably an acrylic resin, a cyclic olefin resin, a polycarbonate resin, a polyester resin, a polyether resin, a polyamide resin, or a polyimide resin. The resin is used at a ratio of preferably 30 wt % or more to 20,000 wt % or less, more preferably 100 wt % or more to 2000 wt % or less with respect to the tantalum oxide fine particle powder.

Hereinafter, examples are given for describing the present invention in detail. However, the present invention is not limited to these examples.

EXAMPLE 1

Method of Measuring Crystallite Size of Tantalum Oxide Fine Particle

The crystallite size of each of tantalum oxide fine particles of this example is a value D(110) calculated from the X-ray diffraction peak of the (110) surface of the tantalum oxide fine particle obtained with an XRD (RINT2100 manufactured by Rigaku Corporation) by using Debye-Scherrer's equation (Eq. 1) described below:

$$D(110) = K^* \pi / \beta \cos \theta \quad \text{(Eq. 1)}$$

where D(110) represents a crystallite size (crystallite size), K=0.9, λCu—Kα1=0.154056 nm, and represents the half width of the diffraction peak.

(Method of Measuring Volume-Average Particle Diameter of Tantalum Oxide Fine Particle)

The volume-average particle diameter of each of the tantalum oxide fine particles of this example was measured with a dynamic light scattering particle diameter distribution-measuring apparatus (ZETASIZER Nano-S manufactured by Malvern Instruments Ltd.).

(Method of Measuring Haze Ratio of Fine Particle Dispersion Liquid Containing Tantalum Oxide Fine Particles)

The haze ratio of a fine particle dispersion liquid containing the tantalum oxide fine particles of this example was measured as described below. A 10-wt % solution of the tantalum oxide fine particles was prepared, and then its haze ratio was measured with a turbidity meter (NDH-2000 manufactured by NIPPON DENSHOKU INDUSTRIES CO., LTD.). A quartz cell having an optical path length of 1 cm was used as a cell. When the solution had a haze ratio of 10% Or less, the solution was judged as having high transparency.

(Evaluation for Dispersibility)

A metal oxide fine particle dispersion liquid was evaluated for its dispersibility by observing the dispersion liquid with the eyes after a lapse of 24 hours from a wet dispersion treatment. The dispersion liquid in which a metal oxide was uniformly dispersed without sedimenting was judged as being GOOD, and the dispersion liquid in which the metal oxide sedimented but was not dispersed was judged as being NG.

(Method of Producing Fine Particle Dispersion Liquid Containing Tantalum Oxide Fine Particles)

Formulation

Tantalum oxide fine particles each having a crystallite size of 20 nm 3.1 parts by weight 3-methacryloxypropyltriethoxysilane 3.1 parts by weight Tetrahydrofuran 24.9 parts by weight Triethylamine 0.6 part by weight A mixture of the above-mentioned components was added to a 100-cc vessel, and was then subjected to a pretreatment with a bead mill dispersing machine (UAM-015 manufactured by IMEX Co., Ltd.) at a number of revolutions of 650 rpm for 10 minutes. After the pretreatment, 104 parts by weight of zirconia beads each having a diameter of 30 μm were further added to the mixture (at a filling factor of 50%), and then the whole was subjected to a treatment at a number of revolutions of 1600 rpm for 360 minutes. The zirconia beads were removed from the resultant slurry by filtration. Thus, a fine particle dispersion liquid containing tantalum oxide fine particles where the tantalum oxide fine particles were dispersed in tetrahydrofuran was obtained. Tantalum oxide in the resultant fine particle dispersion liquid containing the tantalum oxide fine particles had a crystallite size of 5 nm and a volume-average particle diameter of 11 nm, and hence the crystallite size of tantalum oxide after the dispersion became smaller than the crystallite size before the dispersion. In addition, the dispersion liquid had a haze ratio of 7%, and hence its transparency was high.

FIG. 1 shows a TEM photograph of the tantalum oxide fine particles in the fine particle dispersion liquid containing the tantalum oxide fine particles produced in Example 1. As can be seen from the figure, tantalum oxide fine particles each having a particle diameter of about 3 nm or more to 10 nm or less are obtained, and the particle diameter coincides well with the crystallite size calculated from the result of the XRD.

EXAMPLE 2

The same operations as those of Example 1 were performed except that the amount of triethylamine was changed to 0.3 part by weight. Tantalum oxide in the resultant fine particle dispersion liquid containing the tantalum oxide fine particles had a crystallite size of 5 nm and a volume-average particle diameter of 13 nm, and hence the crystallite size of tantalum oxide after the dispersion became smaller than the crystallite size of the raw material. In addition, the dispersion liquid had a haze ratio of 7%, and hence its transparency was high.

EXAMPLE 3

The same operations as those of Example 1 were performed except that the amount of triethylamine was changed to 1.2 parts by weight. Tantalum oxide in the resultant fine particle dispersion liquid containing the tantalum oxide fine particles had a crystallite size of 4 nm and a volume-average particle diameter of 13 nm, and hence the crystallite size of tantalum oxide after the dispersion became smaller than the crystallite size of the raw material. In addition, the dispersion liquid had a haze ratio of 7%, and hence its transparency was high.

EXAMPLE 4

The same operations as those of Example 1 were performed except that tantalum oxide fine particles each having a crystallite size of 50 nm were used instead of the tantalum oxide fine particles each having a crystallite size of 20 nm. Tantalum oxide in the resultant fine particle dispersion liquid containing the tantalum oxide fine particles had a crystallite size of 5 nm and a volume-average particle diameter of 10 nm, and hence the crystallite size of tantalum oxide after the dispersion became smaller than the crystallite size of the raw material. In addition, the dispersion liquid had a haze ratio of 6%, and hence its transparency was high.

EXAMPLE 5

The same operations as those of Example 1 were performed except that triethylamine was changed to n-butylamine. Tantalum oxide in the resultant fine particle dispersion liquid containing the tantalum oxide fine particles had a crystallite size of 3 nm and a volume-average particle diameter of 12 nm, and hence the crystallite size of tantalum oxide after the dispersion became smaller than the crystallite size of the raw material. In addition, the dispersion liquid had a haze ratio of 7%, and hence its transparency was high.

EXAMPLE 6

The same operations as those of Example 1 were performed except that triethylamine was changed to N,N-dibutylamine. Tantalum oxide in the resultant fine particle dispersion liquid containing the tantalum oxide fine particles had a crystallite size of 3 nm and a volume-average particle diameter of 11 nm, and hence the crystallite size of tantalum oxide after the dispersion became smaller than the crystallite size of the raw material. In addition, the dispersion liquid had a haze ratio of 5%, and hence its transparency was high.

EXAMPLE 7

The same operations as those of Example 1 were performed except that triethylamine was changed to aniline. Tantalum oxide in the resultant fine particle dispersion liquid containing the tantalum oxide fine particles had a crystallite size of 5 nm and a volume-average particle diameter of 13 nm, and hence the crystallite size of tantalum oxide after the dispersion became smaller than the crystallite size of the raw material. In addition, the dispersion liquid had a haze ratio of 7%, and hence its transparency was high.

EXAMPLE 8

The same operations as those of Example 1 were performed except that triethylamine was changed to pyridine. Tantalum oxide in the resultant fine particle dispersion liquid containing the tantalum oxide fine particles had a crystallite size of 2 nm and a volume-average particle diameter of 9 nm, and hence the crystallite size of tantalum oxide after the dispersion became smaller than the crystallite size of the raw material. In addition, the dispersion liquid had a haze ratio of 5%, and hence its transparency was high.

EXAMPLE 9

The same operations as those of Example 1 were performed except that triethylamine was changed to tetramethylethylenediamine. Tantalum oxide in the resultant fine particle dispersion liquid containing the tantalum oxide fine particles had a crystallite size of 4 nm and a volume-average particle diameter of 12 nm, and hence the crystallite size of tantalum oxide after the dispersion became smaller than the crystallite size of the raw material. In addition, the dispersion liquid had a haze ratio of 7%, and hence its transparency was high.

EXAMPLE 10

The same operations as those of Example 1 were performed except that triethylamine was changed to 2-(2-aminoethoxy)ethanol. Tantalum oxide in the resultant fine particle dispersion liquid containing the tantalum oxide fine particles had a crystallite size of 5 nm and a volume-average particle diameter of 13 nm, and hence the crystallite size of tantalum oxide after the dispersion became smaller than the crystallite size of the raw material. In addition, the dispersion liquid had a haze ratio of 7%, and hence its transparency was high.

EXAMPLE 11

The same operations as those of Example 1 were performed except that the bead mill dispersion treatment time was changed to 1440 minutes. Tantalum oxide in the resultant fine particle dispersion liquid containing the tantalum oxide fine particles had a crystallite size of 3 nm and a volume-average particle diameter of 10 nm, and hence the crystallite size of tantalum oxide after the dispersion became smaller than the crystallite size of the raw material. In addition, the dispersion liquid had a haze ratio of 5%, and hence its transparency was high.

EXAMPLE 12

The same operations as those of Example 1 were performed except that tetrahydrofuran was changed to methyl methacrylate. Tantalum oxide in the resultant fine particle dispersion liquid containing the tantalum oxide fine particles had a crystallite size of 5 nm and a volume-average particle diameter of 9 nm, and hence the crystallite size of tantalum oxide after the dispersion became smaller than the crystallite size of the raw material. In addition, the dispersion liquid had a haze ratio of 5%, and hence its transparency was high.

COMPARATIVE EXAMPLE 1

The same operations as those of Example 1 were performed except that triethylamine was not added. Tantalum oxide in the resultant fine particle dispersion liquid containing the tantalum oxide fine particles had a crystallite size of 20 nm and a volume-average particle diameter of 36 nm, and hence such an effect that the crystallite size after the dispersion became smaller than the crystallite size of the raw material was not obtained. In addition, the dispersion liquid had a haze ratio of 26%, and was opaque.

COMPARATIVE EXAMPLE 2

The same operations as those of Example 1 were performed except that 3-methacryloxypropyltriethoxysilane was not added. The tantalum oxide fine particles retained an agglomerated state, and were not dispersed in tetrahydrofuran. In addition, such an effect that the crystallite size after the stirring became smaller than the crystallite size of the raw material was not obtained.

COMPARATIVE EXAMPLE 3

Stirring was performed with a stirrer for 1440 minutes instead of the bead mill dispersion in Example 1. The tantalum oxide fine particles retained an agglomerated state, and were not dispersed in tetrahydrofuran. In addition, such an effect that the crystallite size after the stirring became smaller than the crystallite size of the raw material was not obtained.

COMPARATIVE EXAMPLE 4

The same operations as those of Example 1 were performed except that γ-alumina fine particles each having a crystallite size of 7 nm were used instead of the tantalum oxide fine particles each having a crystallite size of 20 nm. As a result, a γ-alumina fine particle dispersion liquid where the γ-alumina fine particles were dispersed in tetrahydrofuran was obtained. γ-Alumina in the resultant γ-alumina fine particle dispersion liquid had a crystallite size of 7 nm and a volume-average particle diameter of 14 nm. In addition, the dispersion liquid had a haze ratio of 10%, and hence its transparency was high. However, such an effect that the crystallite size after the dispersion became smaller than the crystallite size of the raw material was not obtained.

COMPARATIVE EXAMPLE 5

The same operations as those of Example 1 were performed except that zinc oxide fine particles each having a crystallite size of 30 nm were used instead of the tantalum oxide fine particles each having a crystallite size of 20 nm. The zinc oxide fine particles were not uniformly dispersed in tetrahydrofuran. In addition, such an effect that the crystallite size after the bead mill dispersion treatment became smaller than the crystallite size of the raw material was not obtained.

COMPARATIVE EXAMPLE 6

The same operations as those of Example 1 were performed except that titanium oxide fine particles each having a crystallite size of 15 nm were used instead of the tantalum oxide fine particles each having a crystallite size of 10 nm. The titanium oxide fine particles were not uniformly dispersed in tetrahydrofuran. In addition, such an effect that the crystallite size after the bead mill dispersion treatment became smaller than the crystallite size of the raw material was not obtained.

As can be seen from the results of the foregoing examples and comparative examples, the acquisition of a fine particle dispersion liquid containing tantalum oxide fine particles each having a small crystallite size requires a dispersion method by which a strong shear is applied to a fine particle such as bead mill dispersion, the presence of a basic compound, and the presence of a surface modifier. It can also be seen from the results that the phenomenon is a phenomenon peculiar to tantalum oxide.

As can be seen from the results of the foregoing examples and comparative examples, the presence of a basic compound is important in obtaining a fine particle dispersion liquid containing tantalum oxide fine particles each having a small crystallite size, and the fact that the presence is important is a phenomenon peculiar to tantalum oxide. It can also be seen from the results that uniform dispersion of the tantalum oxide fine particles in an organic solvent requires the presence of a surface modifier. Table 1 summarizes the foregoing results.

TABLE 1

| | Raw material metal oxide (crystallite size) | Basic compound | Surface modifier | Organic solvent | Dispersion treatment time | Dispersibility | Crystallite size after dispersion treatment | Volume-average particle diameter after dispersion treatment | Haze ratio of dispersion liquid |
|---|---|---|---|---|---|---|---|---|---|
| Example 1 | 3.1 parts by weight of $Ta_2O_5$ (20 nm) | 0.6 part by weight of triethylamine | 3.1 parts by weight of 3-methacryloxypropyl-triethoxysilane | 24.9 parts by weight of tetrahydrofuran | 360 minutes | GOOD | 5 nm | 11 nm | 6% |
| Example 2 | 3.1 parts by weight of $Ta_2O_5$ (20 nm) | 0.3 part by weight of triethylamine | 3.1 parts by weight of 3-methacryloxypropyl-triethoxysilane | 24.9 parts by weight of tetrahydrofuran | 360 minutes | GOOD | 5 nm | 13 nm | 7% |
| Example 3 | 3.1 parts by weight of $Ta_2O_5$ (20 nm) | 1.2 parts by weight of triethylamine | 3.1 parts by weight of 3-methacryloxypropyl-triethoxysilane | 24.9 parts by weight of tetrahydrofuran | 360 minutes | GOOD | 4 nm | 13 nm | 7% |
| Example 4 | 3.1 parts by weight of $Ta_2O_5$ (50 nm) | 0.6 part by weight of triethylamine | 3.1 parts by weight of 3-methacryloxypropyl-triethoxysilane | 24.9 parts by weight of tetrahydrofuran | 360 minutes | GOOD | 5 nm | 10 nm | 6% |
| Example 5 | 3.1 parts by weight of $Ta_2O_5$ (20 nm) | 0.6 part by weight of butylamine | 3.1 parts by weight of 3-methacryloxypropyl-triethoxysilane | 24.9 parts by weight of tetrahydrofuran | 360 minutes | GOOD | 3 nm | 12 nm | 7% |
| Example 6 | 3.1 parts by weight of $Ta_2O_5$ (20 nm) | 0.6 part by weight of N,N-dibutylamine | 3.1 parts by weight of 3-methacryloxypropyl-triethoxysilane | 24.9 parts by weight of tetrahydrofuran | 360 minutes | GOOD | 3 nm | 11 nm | 5% |
| Example 7 | 3.1 parts by weight of $Ta_2O_5$ (20 nm) | 0.6 part by weight of aniline | 3.1 parts by weight of 3-methacryloxypropyl-triethoxysilane | 24.9 parts by weight of tetrahydrofuran | 360 minutes | GOOD | 5 nm | 13 nm | 7% |

TABLE 1-continued

| | Raw material metal oxide (crystallite size) | Basic compound | Surface modifier | Organic solvent | Dispersion treatment time | Dispersibility | Crystallite size after dispersion treatment | Volume-average particle diameter after dispersion treatment | Haze ratio of dispersion liquid |
|---|---|---|---|---|---|---|---|---|---|
| Example 8 | 3.1 parts by weight of $Ta_2O_5$ (20 nm) | 0.6 part by weight of pyridine | 3.1 parts by weight of 3-methacryloxypropyl-triethoxysilane | 24.9 parts by weight of tetrahydrofuran | 360 minutes | GOOD | 2 nm | 9 nm | 5% |
| Example 9 | 3.1 parts by weight of $Ta_2O_5$ (20 nm) | 0.6 part by weight of tetramethyl-ethylenediamine | 3.1 parts by weight of 3-methacryloxypropyl-triethoxysilane | 24.9 parts by weight of tetrahydrofuran | 360 minutes | GOOD | 4 nm | 12 nm | 7% |
| Example 10 | 3.1 parts by weight of $Ta_2O_5$ (20 nm) | 0.6 part by weight of 2-(2-amino-ethoxy)ethanol | 3.1 parts by weight of 3-methacryloxypropyl-triethoxysilane | 24.9 parts by weight of tetrahydrofuran | 360 minutes | GOOD | 5 nm | 13 nm | 7% |
| Example 11 | 3.1 parts by weight of $Ta_2O_5$ (20 nm) | 0.6 part by weight of triethylamine | 3.1 parts by weight of 3-methacryloxypropyl-triethoxysilane | 24.9 parts by weight of tetrahydrofuran | 1440 minutes | GOOD | 3 nm | 10 nm | 5% |
| Example 12 | 3.1 parts by weight of $Ta_2O_5$ (20 nm) | 0.6 part by weight of triethylamine | 3.1 parts by weight of 3-methacryloxypropyl-triethoxysilane | 24.9 parts by weight of methyl methacrylate | 360 minutes | GOOD | 5 nm | 9 nm | 5% |
| Comparative Example 1 | 3.1 parts by weight of $Ta_2O_5$ (20 nm) | None | 3.1 parts by weight of 3-methacryloxypropyl-triethoxysilane | 24.9 parts by weight of tetrahydrofuran | 360 minutes | GOOD | 20 nm | 36 nm | 26% |
| Comparative Example 2 | 3.1 parts by weight of $Ta_2O_5$ (20 nm) | 0.6 part by weight of triethylamine | None | 24.9 parts by weight of tetrahydrofuran | 360 minutes | NG | 20 nm | Unmeasurable | — |
| Comparative Example 3 | 3.1 parts by weight of $Ta_2O_5$ (20 nm) | 0.6 part by weight of triethylamine | 3.1 parts by weight of 3-methacryloxypropyl-triethoxysilane | 24.9 parts by weight of tetrahydrofuran | Stirring with stirrer for 1440 minutes | NG | 20 nm | Unmeasurable | — |
| Comparative Example 4 | 3.1 parts by weight of $Al_2O_3$ (7 nm) | 0.6 part by weight of triethylamine | 3.1 parts by weight of 3-methacryloxypropyl-triethoxysilane | 24.9 parts by weight of tetrahydrofuran | 360 minutes | GOOD | 7 nm | 14 nm | 10% |
| Comparative Example 5 | 3.1 parts by weight of ZnO (30 nm) | 0.6 part by weight of triethylamine | 3.1 parts by weight of 3-methacryloxypropyl-triethoxysilane | 24.9 parts by weight of tetrahydrofuran | 360 minutes | NG | 30 nm | Unmeasurable | — |
| Comparative Example 6 | 3.1 parts by weight of $TiO_2$ (15 nm) | 0.6 part by weight of triethylamine | 3.1 parts by weight of 3-methacryloxypropyl-triethoxysilane | 24.9 parts by weight of tetrahydrofuran | 360 minutes | NG | 15 nm | Unmeasurable | — |

The tantalum oxide particle dispersion liquid obtained by the production method of the present invention can find applications in the fields of, for example, optical materials, electronic part materials, and recording materials.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-251486, filed Oct. 30, 2009, which is hereby incorporated by reference herein in its entirety.

What is claimed is:

1. A method of producing a fine particle dispersion liquid containing tantalum oxide fine particles, the method comprising:
preparing a mixture of the tantalum oxide fine particles, a basic compound, a surface modifier, and an organic solvent; and
subjecting the mixture to a dispersion treatment.

2. The method of producing a fine particle dispersion liquid according to claim 1, wherein the basic compound comprises an organic amine compound.

3. The method of producing a fine particle dispersion liquid according to claim 1, wherein the basic compound comprises at least one basic compound selected from the group consisting of triethylamine, butylamine, dibutylamine, aniline, pyridine, tetramethylethylenediamine, and 2-(2-aminoethoxy)ethanol.

4. The method of producing a fine particle dispersion liquid according to claim 1, wherein the surface modifier comprises a silane coupling agent.

5. The method of producing a fine particle dispersion liquid according to claim 1, wherein the surface modifier comprises 3-methacryloxypropyltriethoxysilane.

6. The method of producing a fine particle dispersion liquid according to claim 1, wherein the organic solvent comprises at least one of tetrahydrofuran and methyl methacrylate.

7. A method of producing a fine particle dispersion liquid containing tantalum oxide fine particles, the method comprising:

preparing a mixture of the tantalum oxide fine particles, a basic compound, a surface modifier, and an organic solvent; and subjecting the mixture to a dispersion treatment, wherein the dispersion treatment is based on one of a bead mill method and a jet mill method.

8. A fine particle dispersion liquid containing tantalum oxide, comprising:

tantalum oxide fine particles each of which has a crystallite size of 10 nm or less and is covered with a surface modifier;

a basic compound; and an organic solvent.

9. The fine particle dispersion liquid according to claim 8, wherein the tantalum oxide fine particles each have a volume-average particle diameter of 20 nm or less.

10. A fine particle-resin composite obtained from the fine particle dispersion liquid according to claim 8.

11. A method of producing a fine particle dispersion liquid containing tantalum oxide fine particles, the method comprising:

preparing the tantalum oxide fine particles;

mixing the tantalum oxide fine particles prepared, a basic compound, a surface modifier, and an organic solvent to obtain a mixture; and subjecting the mixture to a dispersion treatment.

12. A method of producing a fine particle-resin composite, the method comprising:

mixing a fine particle dispersion liquid produced by the method according to claim 11 and a resin to obtain a mixed liquid; and polymerizing the resin in the mixed liquid.

13. A method of producing a fine particle-resin composite, the method comprising:

obtaining tantalum oxide fine particles coated with a surface modifier from a fine particle dispersion liquid produced by the method according to claim 11;

melting and kneading the tantalum oxide fine particles and a resin; and polymerizing the resin.

14. A method of producing a fine particle-resin composite, the method comprising:

preparing tantalum oxide fine particles;

mixing the tantalum oxide fine particles prepared, a basic compound, a surface modifier, and a curable monomer to obtain a mixture;

subjecting the mixture to a dispersion treatment; and polymerizing the curable monomer in the mixture.

\* \* \* \* \*